(12) United States Patent
Feng et al.

(10) Patent No.: US 11,212,754 B2
(45) Date of Patent: Dec. 28, 2021

(54) METHOD AND APPARATUS FOR DETERMINING TRANSMISSION MODE OF TERMINAL DEVICE

(71) Applicant: Huawei Technologies Co., Ltd., Shenzhen (CN)

(72) Inventors: Shulan Feng, Beijing (CN); Zhe Liu, Beijing (CN); Meng Deng, Beijing (CN); Xiuyong Shen, Beijing (CN); Weimin Xiao, Rolling Meadows, IL (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/991,207

(22) Filed: Aug. 12, 2020

(65) Prior Publication Data
US 2020/0374813 A1 Nov. 26, 2020

Related U.S. Application Data

(63) Continuation of application No. PCT/CN2019/074647, filed on Feb. 2, 2019.

(30) Foreign Application Priority Data

Feb. 13, 2018 (CN) .......................... 201810151029.8

(51) Int. Cl.
*H04W 52/34* (2009.01)
*H04W 52/14* (2009.01)
(Continued)

(52) U.S. Cl.
CPC ............... *H04W 52/34* (2013.01); *H04L 5/22* (2013.01); *H04W 8/24* (2013.01); *H04W 52/146* (2013.01);
(Continued)

(58) Field of Classification Search
CPC . H04W 52/34; H04W 52/146; H04W 52/365; H04W 8/24; H04W 76/16; H04W 88/06; H04L 5/22
See application file for complete search history.

(56) References Cited

U.S. PATENT DOCUMENTS

2002/0080734 A1* 6/2002 Satou ................... H04W 52/12
370/328
2007/0228838 A1* 10/2007 Delmerico ............... H02J 3/50
307/84
(Continued)

FOREIGN PATENT DOCUMENTS

CN 102013952 A 4/2011
CN 102804892 A 11/2012
(Continued)

OTHER PUBLICATIONS

Oppo, "Discussion on Remaining Issues for LTE-NR Dual Connectivity", 3GPP TSG RAN WG1 Meeting 91, R1-1719989, Reno, NV, US, Nov. 27-Dec. 1, 2017, 4 pages.
(Continued)

*Primary Examiner* — Dominic E Rego
(74) *Attorney, Agent, or Firm* — Slater Matsil, LLP

(57) ABSTRACT

A method and an apparatus for determining a transmission mode of a terminal device are provided. The method includes: determining a first power configuration value and a second power configuration value of the terminal device; determining that a sum of the first power configuration value and the second power configuration value is greater than a first threshold; and determining whether the terminal device uses a first transmission mode or a second transmission mode.

19 Claims, 5 Drawing Sheets

(51) Int. Cl.
*H04W 52/36* (2009.01)
*H04W 8/24* (2009.01)
*H04W 76/16* (2018.01)
*H04W 88/06* (2009.01)
*H04L 5/22* (2006.01)

(52) U.S. Cl.
CPC ......... *H04W 52/365* (2013.01); *H04W 76/16* (2018.02); *H04W 88/06* (2013.01)

(56) References Cited

U.S. PATENT DOCUMENTS

| | | | | |
|---|---|---|---|---|
| 2011/0143805 A1* | 6/2011 | Ramasamy | ......... | H04W 52/325 |
| | | | | 455/522 |
| 2012/0326521 A1* | 12/2012 | Bauer | ..................... | H02J 50/60 |
| | | | | 307/104 |
| 2014/0177584 A1* | 6/2014 | Ouchi | ................. | H04W 52/242 |
| | | | | 370/329 |
| 2014/0247796 A1* | 9/2014 | Ouchi | ................... | H04L 5/0053 |
| | | | | 370/329 |
| 2014/0256378 A1* | 9/2014 | Park | ..................... | H04B 1/3838 |
| | | | | 455/552.1 |
| 2014/0295909 A1* | 10/2014 | Ouchi | ................... | H04W 52/40 |
| | | | | 455/522 |
| 2015/0351050 A1* | 12/2015 | Takahashi | ........... | H04W 52/247 |
| | | | | 455/522 |
| 2016/0073360 A1* | 3/2016 | Uchino | ................ | H04W 52/30 |
| | | | | 370/329 |
| 2016/0262172 A1* | 9/2016 | Yan | ......................... | H04L 43/16 |
| 2016/0323833 A1* | 11/2016 | Zhang | ............... | H04W 72/0413 |
| 2017/0034792 A1* | 2/2017 | Shao | .................... | H04W 52/346 |
| 2017/0048807 A1* | 2/2017 | Wang | .................. | H04W 52/367 |
| 2017/0055227 A1* | 2/2017 | Wu | ........................ | H04W 52/24 |
| 2017/0223694 A1* | 8/2017 | Han | .................. | H04W 72/1284 |
| 2018/0067534 A1* | 3/2018 | Viviescas | ............... | H03K 17/22 |
| 2018/0279376 A1* | 9/2018 | Dinan | ............... | H04W 74/0833 |
| 2018/0317180 A1* | 11/2018 | Li | ....................... | H04W 52/242 |
| 2019/0124600 A1* | 4/2019 | Papasakellariou | .. | H04W 52/146 |
| 2019/0174433 A1* | 6/2019 | Nory | .................. | H04W 52/367 |
| 2019/0253988 A1* | 8/2019 | Khoshnevisan | ...... | H04W 52/48 |

FOREIGN PATENT DOCUMENTS

| | | |
|---|---|---|
| CN | 104349443 A | 2/2015 |
| WO | 2008114183 A1 | 9/2008 |
| WO | 2015034299 A1 | 3/2015 |
| WO | 2015116866 A1 | 8/2015 |
| WO | 2017035716 A1 | 3/2017 |
| WO | 2017135044 A1 | 8/2017 |
| WO | 2017166390 A1 | 10/2017 |

OTHER PUBLICATIONS

Intel Corp., "Remaining aspects on power sharing between LTE and NR", 3GPP TSG-RAN WG1 #91, R1-1720105, Reno, NV, US, Nov. 27-Dec. 1, 2017, 3 pages.

* cited by examiner

METHOD AND APPARATUS FOR DETERMINING TRANSMISSION MODE OF TERMINAL DEVICE

CROSS-REFERENCE TO RELATED APPLICATIONS

This application is a continuation of International Application No. PCT/CN2019/074647, filed on Feb. 2, 2019, which claims priority to Chinese Patent Application No. 201810151029.8, filed on Feb. 13, 2018. The disclosures of the aforementioned applications are hereby incorporated by reference in their entireties.

TECHNICAL FIELD

This application relates to the field of communications technologies, and in particular, to a method and an apparatus for determining a transmission mode of a terminal device.

BACKGROUND

A long term evolution (LTE)-new radio (NR) dual connectivity (DC) technology is introduced to Release 15 of a standard protocol. The DC technology means that a terminal device can be simultaneously connected to two base stations: a primary base station and a secondary base station. For example, the primary base station may be an LTE base station, and the secondary base station may be an NR base station.

In addition, the standard protocol further stipulates that when the terminal device is in a DC state, the terminal device can support two transmission modes: a first transmission mode and a second transmission mode. In the prior art, there is no related solution about how to configure different transmission modes for the terminal device in different scenarios.

SUMMARY

This application provides a method and an apparatus for determining a transmission mode of a terminal device, to configure different transmission modes for the terminal device in different scenarios.

According to a first aspect, a method for determining a transmission mode of a terminal device is provided, including: determining, by a second cell group, a first power configuration value and a second power configuration value of the terminal device; determining, by the second cell group, whether a sum of the first power configuration value and the second power configuration value is greater than a first threshold; and if the sum is greater than the first threshold, configuring, by the second cell group, a first transmission mode or a second transmission mode for the terminal device; or if the sum is less than or equal to the first threshold, configuring, by the second cell group, the first transmission mode or the second transmission mode for the terminal device.

In this application, the first power configuration value is a configured transmit power at which the terminal device uses a first radio access technology, and the second power configuration value is a configured transmit power at which the terminal device uses a second radio access technology. The first transmission mode means that a second power is reduced when a sum of a first power and the second power is greater than a second threshold, and the second transmission mode means that a time division multiplexing mode is used to send a first uplink signal and a second uplink signal. The first power is a power for sending the first uplink signal, and the second power is a power for sending the second uplink signal. The first power is less than or equal to the first power configuration value, and the second power is less than or equal to the second power configuration value. The first radio access technology is used to send the first uplink signal, and the second radio access technology is used to send the second uplink signal.

In this application, the first threshold may be a maximum transmit power of the terminal device that is set based on a requirement of a specific absorption rate (SAR) of the terminal device. For example, for an LTE system, the first threshold may be 23 dBm; and for an NR system, the first threshold may be 26 dBm. The first threshold may be the same as or different from the second threshold.

If the sum is less than the first threshold and the terminal device supports the first transmission mode, it may be determined that the terminal device uses the first transmission mode; or if the sum is less than the first threshold but the terminal device does not support the first transmission mode, it may be determined that the terminal device uses the second transmission mode.

It can be learned from the foregoing description that in this embodiment of this application, the second cell group may configure different transmission modes for the terminal device based on different scenarios, to meet a requirement of configuring a transmission mode for the terminal device.

In a feasible design, the determining whether the terminal device uses a first transmission mode or a second transmission mode includes: determining first information, where the first information is used to indicate that the terminal device supports the first transmission mode, or the first information is used to indicate that the terminal device does not support the first transmission mode; and determining, based on the first information, whether the terminal device uses the first transmission mode or the second transmission mode.

It can be learned from the foregoing description that in this embodiment of this application, the second cell group may configure different transmission modes for the terminal device based on the first information.

In a possible design, the first uplink signal is an uplink signal that is to be sent by the terminal device to at least one cell in a first cell group, and the second uplink signal is an uplink signal that is to be sent by the terminal device to at least one cell in the second cell group; and the determining, based on the first information, whether the terminal device uses the first transmission mode or the second transmission mode includes: determining, based on the first information and a first condition, whether the terminal device uses the first transmission mode or the second transmission mode, where the first condition indicates that a subcarrier spacing of the second cell group is greater than or is greater than or equal to a first specified value; or determining, based on the first information and a second condition, whether the terminal device uses the first transmission mode or the second transmission mode, where the second condition indicates that a timing advance is less than or is less than or equal to a second specified value, and the timing advance indicates a time difference between an uplink subframe and a downlink subframe in the first cell group.

Optionally, the determining, based on the first information and a first condition, whether the terminal device uses the first transmission mode or the second transmission mode includes: when the first information indicates that the terminal device supports the first transmission mode and the first condition is met, determining that the terminal device uses the first transmission mode; or when the first information indicates that the terminal device supports the first transmission mode but the first condition is not met, determining that the terminal device uses the second transmission mode.

In this application, when the subcarrier spacing of the second cell group is greater than or is greater than or equal to the first specified value, the terminal device has a sufficient time to adjust a transmit power of a first uplink signal and a transmit power of a second uplink signal, so that the terminal device may use the first transmission mode. In addition, using the first condition as a determining condition is simple and easy to implement, and determining efficiency is comparatively high. In a possible design, the determining, based on the first information and a second condition, whether the terminal device uses the first transmission mode or the second transmission mode includes: when the first information indicates that the terminal device supports the first transmission mode and the second condition is met, determining that the terminal device uses the first transmission mode; or when the first information indicates that the terminal device supports the first transmission mode but the second condition is not met, determining that the terminal device uses the second transmission mode.

In this embodiment of this application, when the timing advance of the second cell group is greater than the second specified value, the terminal device may have a sufficient time to schedule the transmit power of the first uplink signal and the transmit power of the second uplink signal. In addition, an algorithm is simple, execution efficiency is high, and implementation is simple.

In a possible design, after the determining that the terminal device uses the first transmission mode, the method further includes: receiving second information, where the second information is reported by the terminal device, and the second information is used to indicate whether the terminal device supports the first transmission mode in a current scheduling condition; and determining, based on the second information, that the terminal device uses the second transmission mode.

In this application, the second information may be temporary capability reporting information of the terminal device. For example, the second information may have a predefined valid time period, and the valid time period is related to the current scheduling condition. For example, the predefined valid time period of the second information may be within 8 ms. In this case, the second information is valid only within 8 ms after the second cell group receives the second information. In other words, switching between transmission modes of the terminal device may be performed with reference to the second information within 8 ms after the second information is received. When duration after the second cell group receives the second information exceeds 8 ms, switching between transmission modes of the terminal device may be performed no longer with reference to the second information.

For another example, the terminal device may periodically or aperiodically report the second information. For example, the terminal device may report the second information every 2 ms. Effective duration of the second information received each time is duration from a time point at which the second information is received to a time point at which second information is received next time.

In this embodiment of this application, the first information may be information initially reported by the terminal device, and the second information may be information updated by the terminal device in real time based on current scheduling information. In other words, in this embodiment of this application, a transmission mode of the terminal device may be switched in real time, to update the transmission mode of the terminal device in real time. In a possible design, after the determining that the terminal device uses the first transmission mode, the method further includes: determining that the second uplink signal cannot be correctly received within a preset time period; and determining that the terminal device uses the second transmission mode.

In a possible design, the first uplink signal is the uplink signal that is to be sent by the terminal device to the at least one cell in the first cell group, and the second uplink signal is the uplink signal that is to be sent by the terminal device to the at least one cell in the second cell group; and after the determining that the terminal device uses the first transmission mode, the method further includes: obtaining the subcarrier spacing of the second cell group; obtaining the timing advance of the first cell group, where the timing advance indicates the time difference between the uplink subframe and the downlink subframe in the first cell group; obtaining first power control calculation duration and second power control calculation duration of the terminal device, where the first power control calculation duration is duration from a time point at which the terminal device receives scheduling information of the first cell group to a time point at which a transmit power of the first cell group has been calculated; and the second power control calculation duration is duration from a time point at which the terminal device starts to calculate a transmit power of the second cell group to a time point at which the terminal device starts to send the second uplink signal; and determining, based on at least one of the first power control calculation duration, the second power control calculation duration, the subcarrier spacing of the second cell group, and the timing advance of the first cell group, that the terminal device uses the second transmission mode.

In a possible design, the second information is capability reporting information of the terminal device; or the second information is information, obtained from power headroom reporting information of the terminal device, about whether the terminal device supports the first transmission mode; or the second information is information, obtained from other information reported by the terminal device, about whether the terminal device supports the first transmission mode.

In a possible design, the first specified value is 30 kilohertz, and the second specified value is 0.1 millisecond.

According to a second aspect, a communication method is provided, including: determining, by a terminal device, second information, where the second information is used to indicate whether the terminal device supports the first transmission mode in a current scheduling condition; and sending, by the terminal device, the second information.

In a possible design, the second information is capability reporting information of the terminal device; or the second information is information that is carried in power headroom reporting information of the terminal device; or the second information is information that is carried in other information reported by the terminal device.

According to a third aspect, a communication method is provided, including: determining, by a terminal device, first power control calculation duration and second power control calculation duration, where the first power control calculation duration is duration from a time point at which the terminal device receives scheduling information of the first cell group to a time point at which a transmit power of the first cell group has been calculated; and the second power control calculation duration is duration from a time point at which the terminal device starts to calculate a transmit power of the second cell group to a time point at which the terminal device starts to send the second uplink signal; and sending, by the first terminal device, first power control calculation duration and second power control calculation duration.

According to a fourth aspect, this application provides an apparatus for determining a transmission mode of a terminal device, where the apparatus is applied to a cell group of a network device, and includes units or means that are configured to perform the steps in the first aspect.

According to a fifth aspect, this application provides a communications apparatus, where the apparatus is applied to a terminal device, and includes units or means that are configured to perform the steps in the second aspect.

According to a sixth aspect, this application provides a communications apparatus, where the apparatus is applied to a terminal device, and includes units or means that are configured to perform the steps in the first aspect.

According to a seventh aspect, this application provides an apparatus for determining a transmission mode of a terminal device, where the apparatus is applied to the terminal device, and includes at least one processing element and at least one storage element. The at least one storage element is configured to store a program and data, and the at least one processing element is configured to perform the method provided in the first aspect of this application.

According to an eighth aspect, this application provides a communications apparatus, where the apparatus is applied to a network device, and includes at least one processing element and at least one storage element. The at least one storage element is configured to store a program and data, and the at least one processing element is configured to perform the method provided in the second aspect.

According to a ninth aspect, this application provides a communications apparatus, where the apparatus is applied to a network device, and includes at least one processing element and at least one storage element. The at least one storage element is configured to store a program and data, and the at least one processing element is configured to perform the method provided in the third aspect.

According to a tenth aspect, this application provides a communications apparatus, where the apparatus is applied to a cell group of a network device, and includes at least one processing element (or chip) configured to perform the method in the first aspect.

According to an eleventh aspect, this application provides a communications apparatus, where the apparatus is applied to a terminal device, and includes at least one processing element (or chip) configured to perform the method in the second aspect.

According to a twelfth aspect, this application provides a communications apparatus, where the apparatus is applied to a terminal device, and includes at least one processing element (or chip) configured to perform the method in the third aspect.

According to a thirteenth aspect, this application provides a program, and the program is used to perform the method in any one of the foregoing aspects when being executed by a processor.

According to a fourteenth aspect, this application provides a program product, for example, a computer-readable storage medium, where the program product includes programs in the first aspect to the third aspect.

It can be learned from the foregoing description that in the embodiments of this application, the second cell group may determine the first power configuration value and the second power configuration value, then determine that the sum of the first power configuration value and the second power configuration value is greater than the first threshold, and finally determine whether the terminal device uses the first transmission mode or the second transmission mode. It can be learned that different transmission modes can be configured for the terminal device in different scenarios according to the method and the apparatus in this application.

DETAILED DESCRIPTION OF ILLUSTRATIVE EMBODIMENTS

The following describes the technical solutions in the embodiments of this application with reference to the accompanying drawings in the embodiments of this application.

Figure 1:
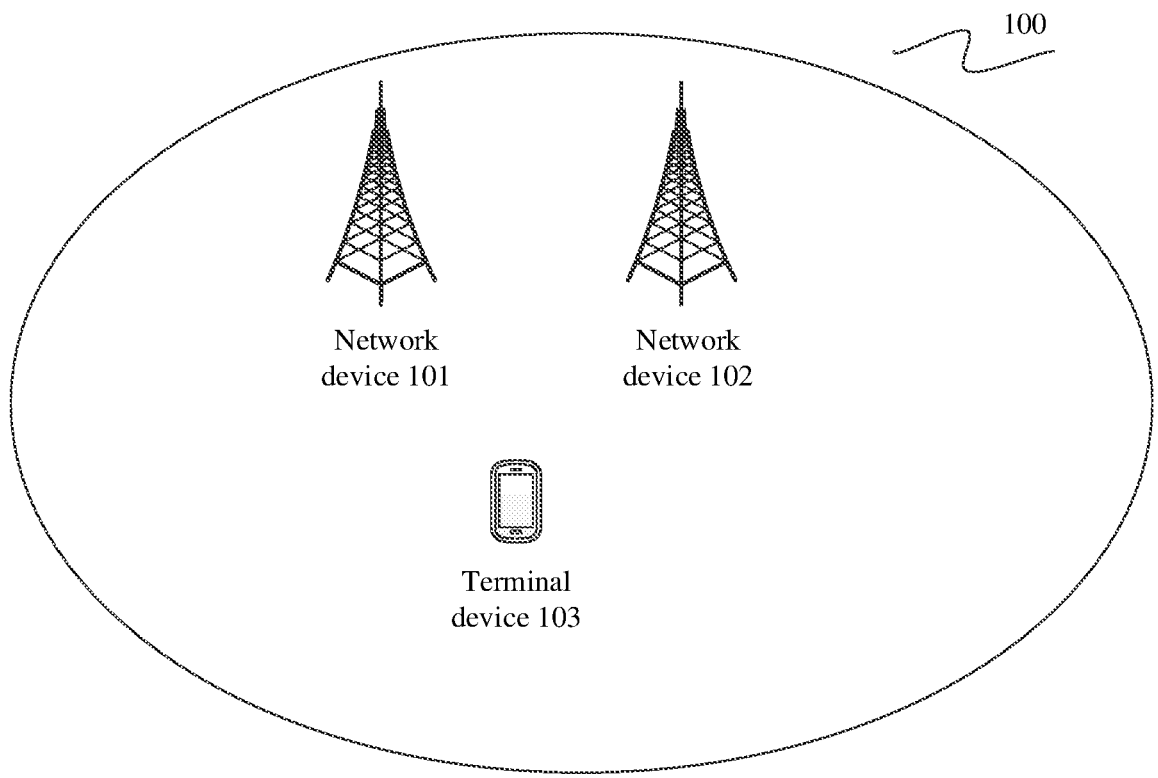
FIG. 1 is a block diagram of a system according to an embodiment of this application.

FIG. 1 shows a communications system wo according to an embodiment of this application. The communications system wo includes a network device 101, a network device 102, and a terminal device 103.

The network device 101 may use a first radio access technology (RAT), and the network device 102 may use a second RAT. For example, the first radio access technology may be a long term evolution (LTE) technology, and the second radio access technology may be a new radio (NR) technology.

In an embodiment of this application, a first cell group may be served by the network device 101, and a second cell group may be served by the network device 102. The first cell group uses the first radio access technology. For example, the first cell group uses the LTE technology, and the first cell group may be referred to as an LTE cell group. The second cell group may use the second radio access technology. For example, the second cell group may use the NR technology, and the second cell group may be referred to as an NR cell group. The first cell group may include one or more cells, and each cell in the first cell group uses the first radio access technology. The second cell group may include one or more cells, and each cell in the second cell group uses the second radio access technology.

In another embodiment of this application, the first cell group may be served by the network device 101 and the network device 102, and the second cell group is served by the network device 102.

In another embodiment of this application, the first cell group may be served by the network device 101, and the second cell group may be served by the network device 102 and the network device 102.

In another embodiment of this application, the first cell group may be served by the network device 101 and the network device 102, and the second cell group may be served by the network device 101 and the network device 102.

In this embodiment of this application, at least one of the network device 101 and the network device 102 may configure a first power configuration value and a second power configuration value for the terminal device 103. The first power configuration value and the second power configuration value may be configured through higher layer signaling, for example, radio resource control (RRC) signaling. The first power configuration value may be a configured transmit power at which the terminal device 103 uses the first radio access technology. In other words, the first power configuration value is a power configuration value used for the terminal device 103 to send an uplink signal to the first cell group. When the terminal device 103 sends a first uplink signal to the first cell group, a transmit power of the first uplink signal may be determined with reference to the first power configuration value, and cannot exceed the first power configuration value. The second power configuration value is a configured transmit power at which the terminal device 103 uses the second radio access technology. In other words, the second power configuration value is a power configuration value used for the terminal device 103 to send an uplink signal to the second cell group. When the terminal device 103 sends a second uplink signal to the second cell group, a transmit power of the second uplink signal may be determined with reference to the second power configuration value, and cannot exceed the second power configuration value.

In this embodiment of this application, if the uplink signal sent by the terminal device 103 to the first cell group is the first uplink signal, a power for sending the first uplink signal by the terminal device 103 is a first power, and the first power is less than or equal to the first power configuration value. If the uplink signal sent by the terminal device 103 to the second cell group is the second uplink signal, a power for sending the second uplink signal by the terminal device 103 is the second power, and the second power is less than or equal to the second power configuration value.

In this embodiment of this application, the terminal device 103 can support a plurality of transmission modes. For example, the terminal device 103 can support two transmission modes: a first transmission mode and a second transmission mode. The first transmission mode means that, when a sum of the first power and the second power is greater than a second threshold, the terminal device 103 adjusts the sum of the first power and the second power by reducing the second power. The second transmission mode means that the terminal device 103 uses a time division multiplexing mode to send the first uplink signal and the second uplink signal. For example, when sending the first uplink signal, the terminal device 103 stops sending the second uplink signal, or when sending the second uplink signal, the terminal device 103 stops sending the first uplink signal.

How to configure a transmission mode for the terminal device based on the first power configuration value and the second power configuration value of the terminal device, for example, whether to configure the first transmission mode or the second transmission mode for the terminal device, is a problem to be resolved in this application.

In this embodiment of this application, the network device 101 and the network device 102 may be devices, in a network, through which the terminal device is connected to a wireless network. The network device is a node in a radio access network, and may also be referred to as a base station, or may be referred to as a radio access network (RAN) node (or device). Currently, some examples of the network device are as follows: a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), and a wireless fidelity (Wi-Fi) access point (AP). In addition, in a network structure, the network device may include a centralized unit (CU) node and a distributed unit (DU) node. In this structure, a protocol layer of an eNB in a long term evolution (LTE) system is divided, where some functions of the protocol layer are centrally controlled by the CU, the remaining functions or all functions of the protocol layer are distributed in the DU, and the DU is centrally controlled by the CU.

In this embodiment of this application, the terminal device 103 may also be referred to as user equipment (UE), a mobile station (MS), a mobile terminal (MT), or the like, and is a device that provides voice and/or data connectivity for a user, for example, a handheld device or a vehicle-mounted device having a wireless connection function. Currently, some examples of the terminal are as follows: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, and a wireless terminal in a smart home.

In this embodiment of this application, the communications system 100 may include various radio access technology (RAT) systems and other systems. For example, the radio access technology systems may be a code division multiple access (CDMA) system, a time division multiple access (TDMA) system, a frequency division multiple access (FDMA) system, an orthogonal frequency-division multiple access (OFDMA) system, and a single carrier frequency division multiple access (single carrier FDMA, SC-FDMA) system. The terms "system" and "network" can be interchanged with each other. Radio technologies such as universal terrestrial radio access (UTRA) and CDMA 2000 may be implemented in the CDMA system. UTRA may include a wideband CDMA (WCDMA) technology and another variation technology of CDMA. CDMA 2000 may include the interim standard (IS) 2000 (IS-2000), the IS-95 standard, and the IS-856 standard. A radio technology such as a global system for mobile communications (GSM) may be implemented in the TDMA system. Radio technologies such as evolved universal terrestrial radio access (E-UTRA), ultra mobile broadband (UMB), IEEE 802.11 (Wi-Fi), IEEE 802.16 (WiMAX), IEEE 802.20, and Flash OFDMA may be implemented in the OFDMA system. UTRA and E-UTRA respectively correspond to UMTS and evolved UMTS. 3GPP long term evolution (LTE) and evolved releases based on LTE are new UMTS releases based on E-UTRA. In addition, the communications system is also applicable to a future-oriented communications technology. The technical solutions in the embodiments of this application are applicable to a scenario in which information transmission needs to be performed between UE and a base station when the UE is in a dual-connectivity state in a communications system using a new communications technology. A system architecture and a service scenario described in this embodiment of this application are intended to describe the technical solutions in the embodiments of this application more clearly, and do not constitute any limitation to the technical solutions provided in the embodiments of this application. A person of ordinary skill in the art may know that, with evolution of network architectures and emergence of new service scenarios, the technical solutions provided in the embodiments of this application are also applicable to a similar technical problem.

In addition, it should be understood that in descriptions of this application, terms such as "first" and "second" are merely used for differentiation and description, but should not be understood as an indication or implication of relative importance or an indication or implication of an order.

Figure 2:
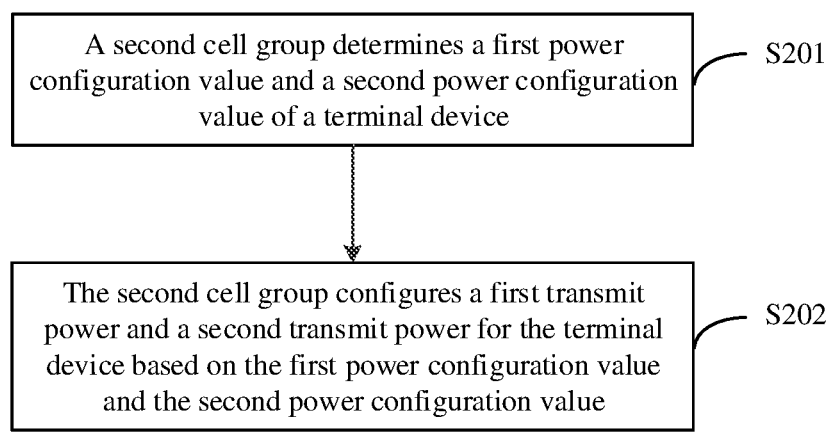
FIG. 2 is a method flowchart of a method for determining a transmission mode of a terminal device according to an embodiment of this application.

Based on an application scenario shown in FIG. 1, this application provides a procedure of a method for determining a transmission mode of a terminal device. A second cell group in the procedure is a cell group that is served by the second network device 102 in the communications system wo shown in FIG. 1. A terminal device may be the terminal device 103 in the communications system wo shown in FIG. 1. As shown in FIG. 2, the method is specifically as follows.

Step S201: The second cell group determines a first power configuration value and a second power configuration value of the terminal device.

Step S202: The second cell group configures a first transmit power and a second transmit power for the terminal device based on the first power configuration value and the second power configuration value.

In an example of this application, the second cell group may determine whether a sum of the first power configuration value and the second power configuration value is greater than a first threshold.

The first threshold may be a maximum transmit power of the terminal device that is set based on a requirement of a specific absorption rate (Specific Absorption Rate, SAR) of the terminal device. For example, for an LTE system, the first threshold may be 23 dBm; and for an NR system, the first threshold may be 26 dBm.

If the sum is less than the first threshold and the terminal device supports a first transmission mode, the second cell group may determine that the terminal device uses the first transmission mode; or if the sum is less than the first threshold but the terminal device does not support a first transmission mode, the second cell group may determine that the terminal device uses a second transmission mode.

Figure 3:
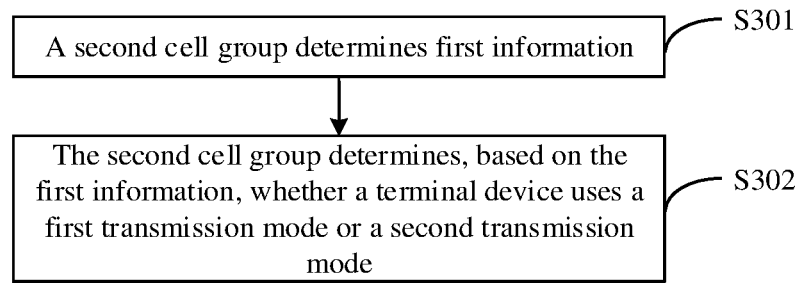
FIG. 3 is a method flowchart of a method for determining a transmission mode of a terminal device according to an embodiment of this application.

If the sum is greater than the first threshold, the second cell group may configure a first transmission mode or a second transmission mode for the terminal device according to a method shown in FIG. 3.

As shown in FIG. 3, when the sum of the first power configuration value and the second power configuration value is greater than the first threshold, the second cell group may determine, in the following manner, whether the terminal device uses the first transmission mode or the second transmission mode. Details are as follows.

Step S301: The second cell group determines first information.

The first information may be specifically information that is reported by the terminal device. Alternatively, the first information may be specifically information that is obtained from a first cell group, the second cell group, or another network device. The another network device may be, for example, a core network of an NR network, an access network of an NR network, a core network of an LTE network, or an access network of an LTE network.

In an example of this application, when the terminal device supports two transmission modes: the first transmission mode and the second transmission mode, the first information may be used to indicate that the terminal device supports the first transmission mode, or the first information is used to indicate that the terminal device does not support the first transmission mode. For example, when the first information is 0, it may indicate that the terminal device supports the first transmission mode; and when the first information is 1, it may indicate that the terminal device does not support the first transmission mode. For another example, when the first information is 1, it may indicate that the terminal device supports the first transmission mode; and when the first information is 0, it indicates that the terminal device does not support the first transmission mode.

In another example of this application, when the terminal device supports two transmission modes: the first transmission mode and the second transmission mode, the first information may also be used to indicate that the terminal device supports one of the first transmission mode and the second transmission mode. For example, when the first information is 0, it indicates that the terminal device supports the first transmission mode; and when the first information is 1, it indicates that the terminal device supports the second transmission mode. For another example, when the first information is 1, it indicates that the terminal device supports the first transmission mode; and when the first information is 0, it indicates that the terminal device supports the second transmission mode.

In still another example of this application, the terminal device can support N transmission modes, where N is a positive integer greater than 2. The first information may indicate that the terminal device supports a specific transmission mode of the N transmission modes. The first information may be indicated in a form of a bitmap (bitmap). A quantity of bits of the bitmap is related to a value of N. For example, when the terminal device supports three transmission modes: the first transmission mode, the second transmission mode, and a third transmission mode, a 2-bit bitmap may be used to indicate a specific transmission mode supported by the terminal device. For example, when the first information is 00, it indicates that the terminal device supports the first transmission mode; when the first information is 01, it indicates that the terminal device supports the second transmission mode; and when first information is 10, it indicates that the terminal device supports the third transmission mode.

Step S302: The second cell group determines, based on the first information, whether the terminal device uses the first transmission mode or the second transmission mode.

In step S302, the second cell group determines, in the following provided four manners, whether the terminal device uses the first transmission mode or the second transmission mode.

Manner 1: If the first information indicates that the terminal device supports the first transmission mode, the second cell group determines that the terminal device uses the first transmission mode; or if the first information indicates that the terminal device does not support the first transmission mode, the second cell group determines that the terminal device uses the second transmission mode.

Manner 2: The second cell group determines, based on the first information and a first condition, whether the terminal device uses the first transmission mode or the second transmission mode.

In an example of this application, the first condition may indicate that a subcarrier spacing of the second cell group is greater than or is greater than or equal to a first specified value. For example, the first specified value may be 30 kHz. The subcarrier spacing may also be referred to as (SCS). Alternatively, the first condition may indicate that a subcarrier spacing of the second cell group is less than or is less than or equal to a first specified value. Alternatively, the first condition may indicate that a subcarrier spacing of the first cell group is greater than or is greater than or equal to a first specified value. Alternatively, the first condition may indicate that a subcarrier spacing of the first cell group is less than or is less than or equal to a first specified value. Alternatively, the first condition is another condition associated with the subcarrier spacing. For example, the first condition may be that the subcarrier spacing of the second cell group needs to be greater than or equal to the first threshold and needs to be less than or equal to a second threshold.

Specifically, when the first information indicates that the terminal device supports the first transmission mode and the first condition is met, the second cell group determines that the terminal device uses the first transmission mode; or when the first information indicates that the terminal device supports the first transmission mode but the first condition is not met, the second cell group determines that the terminal device uses the second transmission mode.

In this embodiment of this application, when the subcarrier spacing of the second cell group is greater than or is greater than or equal to the first specified value, the terminal device has a sufficient time to adjust a transmit power of a first uplink signal and a transmit power of a second uplink signal, so that the terminal device may use the first transmission mode. In addition, using the first condition as a determining condition is simple and easy to implement, and determining efficiency is comparatively high.

Manner 3: The second cell group determines, based on the first information and a second condition, whether the terminal device uses the first transmission mode or the second transmission mode.

In an example of this application, the second condition may indicate that a timing advance is less than or is less than or equal to a second specified value, where the timing advance may indicate a time difference between an uplink subframe and a downlink subframe in the first cell group. For example, the second specified value may be 0.1 millisecond. The timing advance may also be referred to as (TA). Alternatively, the timing advance may indicate a time difference between an uplink subframe and a downlink subframe in the second cell group.

In an example of this application, the second condition may indicate that a timing advance is greater than or is greater than or equal to a second specified value, where the timing advance may indicate a time difference between an uplink subframe and a downlink subframe in the first cell group. Alternatively, the timing advance may indicate a time difference between an uplink subframe and a downlink subframe in the second cell group.

In still another example of this application, alternatively, the second condition may be another condition related to the timing advance. For example, the second condition may indicate that the timing advance needs to be greater than a first threshold and less than a second threshold. Alternatively, the second condition may indicate that the timing advance needs to meet an operation manner or the like.

In this embodiment of this application, when the timing advance of the first cell group meets a condition, it is further ensured that the terminal device can use the first transmission mode to send the first uplink signal and the second uplink signal.

Specifically, when the first information indicates that the terminal device supports the first transmission mode and the second condition is met, the second cell group determines that the terminal device uses the first transmission mode; or when the first information indicates that the terminal device supports the first transmission mode but the second condition is not met, the second cell group determines that the terminal device uses the second transmission mode.

In this embodiment of this application, when the timing advance of the second cell group is greater than the second specified value, the terminal device may have a sufficient time to schedule the transmit power of the first uplink signal and the transmit power of the second uplink signal. In addition, an algorithm is simple, execution efficiency is high, and implementation is simple.

Manner 4: The second cell group determines, based on the first information and second information, whether the terminal device uses the first transmission mode or the second transmission mode. The second information is information, reported by the terminal device in a current scheduling condition, about whether the terminal device supports the first transmission mode; or the second information is historical scheduling information of the second cell group.

Specifically, when both the first information and the second information indicate that the terminal device supports the first transmission mode, the second cell group determines that the terminal device uses the first transmission mode; otherwise, the second cell group determines that the terminal device uses the second transmission mode. For example, when the first information indicates that the terminal device supports the first transmission mode but the second information indicates that the terminal device does not support the first transmission mode, the second cell group determines that the terminal device uses the second transmission mode.

In this embodiment of this application, the first information may be information initially reported by the terminal device, and the second information may be information updated by the terminal device in real time based on current scheduling information. In other words, in this embodiment of this application, a transmission mode of the terminal device may be switched in real time, to update the transmission mode of the terminal device in real time.

Figure 4:
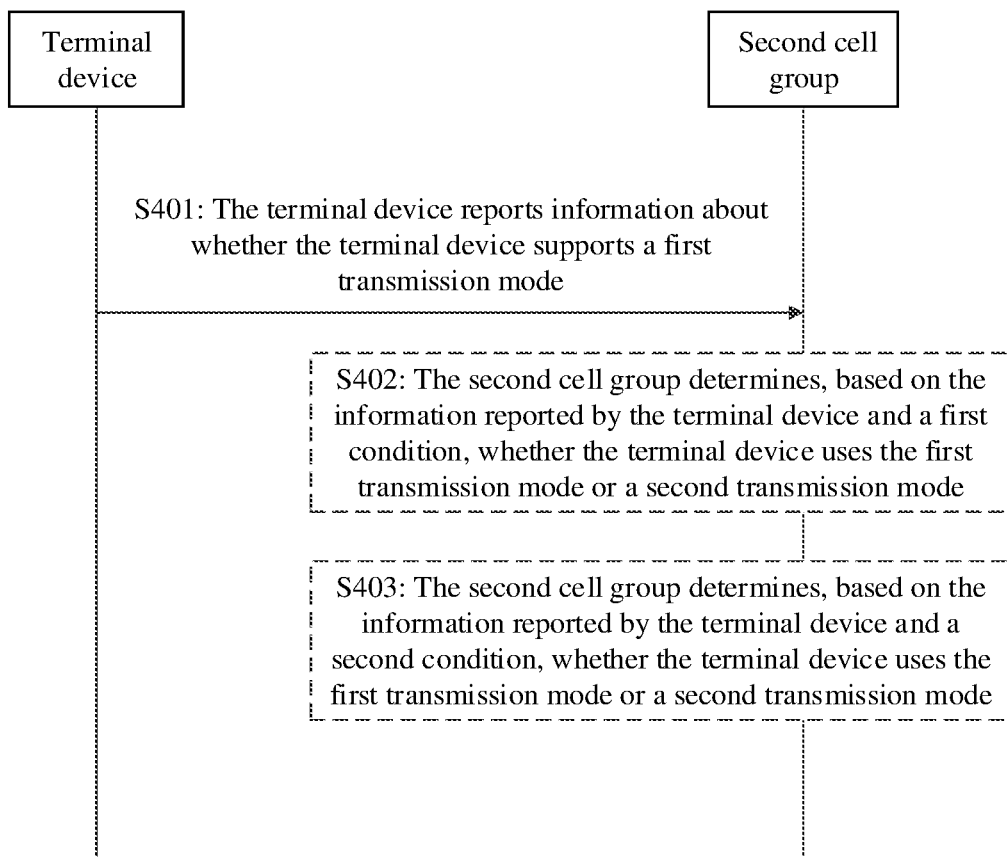
FIG. 4 is a method flowchart of a method for determining a transmission mode of a terminal device according to an embodiment of this application.

Based on information about how to determine, based on the first information and the first condition in the procedure shown in FIG. 3, whether the terminal device uses the first transmission mode or the second transmission mode, this application provides a specific implementation procedure. As shown in FIG. 4, the procedure is specifically as follows.

Step S401: The terminal device reports information about whether the terminal device supports the first transmission mode.

Specifically, the terminal device may report the information about whether the terminal device supports the first transmission mode to the first cell group, and the first cell group may forward the information to the second cell group. Alternatively, the terminal device may directly report the information about whether the terminal device supports the first transmission mode to the second cell group. Whether the terminal device supports the first transmission mode may also be referred to as information about whether the terminal device supports a dynamic power control capability.

In this embodiment of this application, the first cell group may be an LTE cell group, and the second cell group may be an NR cell group. Alternatively, both the first cell group and the second cell group may be LTE groups. Alternatively, both the first cell group and the second cell group may be NR cell groups. Alternatively, the first cell group may be an NR cell group, and the second cell group may be an LTE cell group.

In an example of this application, when the first cell group may be an LTE cell group, and the second cell group may be an NR cell group, the dynamic power control capability means that, when $P\_LTE+P\_NR>\hat{P}_{Total}^{EN-DC}$, whether the terminal device has a capability of reducing a power by reducing an NR power to a non-zero value through power back-off, to ensure that a total transmit power of an LTE power and the NR power does not exceed $\hat{P}_{Total}^{EN-DC}$. P_LTE represents a maximum transmit power, of the LTE cell group, that is configured through higher layer signaling (for example, RRC signaling). P_NR represents a maximum transmit power, of the NR cell group, that is configured through higher layer signaling (for example, RRC signaling). P_LTE may represent the first power configuration value in the procedure shown in FIG. 2. P_NR may represent the second power configuration value in the procedure shown in FIG. 2. $\hat{P}_{Total}^{EN-DC}$ represents a preset power threshold, and may correspond to the first threshold in the procedure shown in FIG. 2.

Step S402: The second cell group determines, based on the information reported by the terminal device and the first condition, whether the terminal device uses the first transmission mode or the second transmission mode.

The first condition may indicate that the subcarrier spacing of the second cell group is greater than or is greater than or equal to 30 kHz. Currently, subcarrier spacings of the second cell group include 15 kHz, 30 kHz, 60 kHz, 120 kHz, 240 kHz, and 480 kHz. In this embodiment of this application, when the subcarrier spacing of the second cell group is 30 kHz, 60 kHz, 120 kHz, 240 kHz, or 480 kHz, it may be considered that the first condition is met.

Specifically, when the information reported by the terminal device indicates that the terminal device does not support the first transmission mode, the second cell group may determine that the terminal device uses the second transmission mode. When the information reported by the terminal device indicates that the terminal device supports the first transmission mode and the first condition is met, the second cell group may determine that the terminal device uses the first transmission mode. When the information reported by the terminal device indicates that the terminal device supports the first transmission mode but the first condition is not met, the second cell group may determine that the terminal device uses the second transmission mode.

In this embodiment of this application, optionally, step S402 may be replaced with step S403. Details are as follows.

Step S403: The second cell group determines, based on the information reported by the terminal device and the second condition, whether the terminal device uses the first transmission mode or the second transmission mode.

The second condition indicates that the timing advance is less than 0.1 ms. The timing advance indicates the time difference between an uplink subframe and a downlink subframe in the second cell group. For example, in the second cell group, the uplink subframe includes an uplink subframe (Q−4), an uplink subframe (Q−3), an uplink subframe (Q−2), an uplink subframe (Q−1), and an uplink subframe q; the downlink subframe includes a downlink subframe (Q−4), a downlink subframe (Q−3), a downlink subframe (Q−2), a downlink subframe (Q−1), and a downlink subframe q; and the timing advance may represent a time difference between the uplink subframe (Q−4) and the downlink subframe (Q−4), or a time difference between the uplink subframe (Q−3) and the downlink subframe (Q−3), a time difference between the uplink subframe q and the downlink subframe q, or the like. It should be understood that the subframe may alternatively be replaced with another time unit, for example, a slot (slot).

In this embodiment of this application, after the NR cell group determines whether the terminal device uses the first transmission mode or the second transmission mode, the terminal device may simultaneously send the first uplink signal to the first cell group and send the second uplink signal to the second cell group. A power for sending the first uplink signal may be represented as P_LTE_UL, and a power for sending the second uplink signal may be represented as P_NR_UL.

Differently, if the second cell group determines that the terminal device uses the first transmission mode, when a transmit power of the terminal device meets a condition that P_LTE_UL+P_NR_UL>Pcmax, the terminal device may reduce a value of P_NR_UL, to enable the transmit power of the terminal device to always meet that P_LTE_UL+P_NR_UL Pcmax. P_LTE_UL may represent a power for sending the first uplink signal to the first cell group by the terminal device, that is, the first power in the procedure shown in FIG. 2. P_NR_UL may represent a power for sending the second uplink signal to the second cell group by the terminal device, that is, the second power in the procedure shown in FIG. 2. Pcmax may represent the second threshold in the procedure shown in FIG. 2. A value of the second threshold may be the same as or different from a value of the first threshold.

If the second cell group determines that the terminal device uses the second transmission mode, when the transmit power of the terminal device meets the condition that P_LTE_UL+P_NR_UL>Pcmax, the terminal device may use a time division multiplexing mode to send the first uplink signal and the second uplink signal. For example, when sending the first uplink signal, the terminal device may stop sending the second uplink signal; or when sending the second uplink signal, the terminal device may stop sending the first uplink signal.

Figure 5:
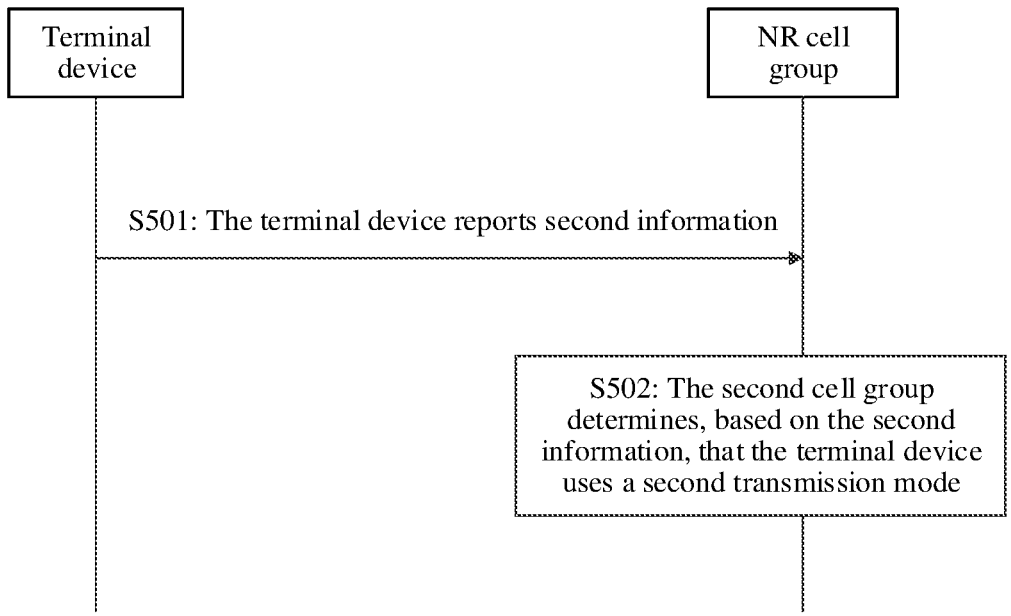
FIG. 5 is a method flowchart of a method for determining a transmission mode of a terminal device according to an embodiment of this application.

Optionally, in this embodiment of this application, after the method shown in FIG. 2, FIG. 3, or FIG. 4 is used to determine that the terminal device uses the first transmission mode, as shown in FIG. 5, the method further includes the following steps.

Step S501: The terminal device reports the second information.

Specifically, the second information is specifically used to indicate that the terminal device supports the first transmission mode in the current scheduling condition, or the second information is specifically used to indicate that the terminal device does not support the first transmission mode in the current scheduling condition.

The second information may be capability reporting information of the terminal device. Alternatively, the second information is information, obtained from power headroom report information of the terminal device, about whether the terminal device supports the first transmission mode. Alternatively, the second information is information, obtained from other information reported by the terminal device, about whether the terminal device supports the first transmission mode.

In an example of this application, a process in which the terminal device reports the second information may be as follows.

First, the terminal device obtains first power control calculation duration $\Delta T_{cal\_PC,LTE}$, where $\Delta T_{cal\_PC,LTE}$ may be defined as a processing time period from a time point at which the first cell group starts timing from a subframe N to a time point at which the terminal calculates an uplink subframe M.

Second, the terminal device obtains second power calculation duration $\Delta T_{cal\_PC,NR}$, where $\Delta T_{cal\_PC,NR}$ may be defined as a processing time period from a time point at which the second cell group calculates power control to a time point at which corresponding uplink sending is performed.

Second, the terminal device determines whether a difference between $\Delta T_{cal\_PC,LTE}$ and $\Delta T_{cal\_PC,NR}$ is greater than a preset threshold. If the difference is greater than the preset threshold, it may be considered that the terminal device supports the first transmission mode in the current scheduling condition; or if the difference is less than or equal to the preset threshold, it may be considered that the terminal device does not support the first transmission mode in the current scheduling condition.

Step S502: The second cell group determines, based on the second information, that the terminal device uses the second transmission mode.

Specifically, if the second information indicates that the terminal device does not support the first transmission mode in the current scheduling condition, the terminal device may switch a transmission mode used by the terminal device from the first transmission mode to the second transmission mode.

In other words, in this embodiment of this application, the terminal device initially reports capability information, that is, the first information, to indicate whether the terminal device supports the first transmission mode. However, during specific working, if finding that the terminal device cannot support the first transmission mode in the current scheduling condition, the terminal device may report the second information to the NR cell group, and the NR cell group may switch the transmission mode used by the terminal device from the first transmission mode to the second transmission mode.

The second information may be temporary capability reporting information of the terminal device.

For example, the second information may have a predefined valid time period, and the valid time period is related to the current scheduling condition. For example, the predefined valid time period of the second information may be within 8 ms. In this case, the second information is valid only within 8 ms after the second cell group receives the second information. In other words, switching between transmission modes of the terminal device may be performed with reference to the second information within 8 ms after the second information is received. When duration after the second cell group receives the second information exceeds 8 ms, switching between transmission modes of the terminal device may be performed no longer with reference to the second information.

For another example, the terminal device may periodically or aperiodically report the second information. For example, the terminal device may report the second information every 2 ms. Effective duration of the second information received each time is duration from a time point at which the second information is received to a time point at which second information is received next time.

Similarly, in this embodiment of this application, after the second cell group determines that the terminal device uses the second transmission mode, if the second information indicates that the terminal device supports the first transmission mode in the current scheduling condition, the second cell group may switch the transmission mode used by the terminal device from the second transmission mode to the first transmission mode.

Optionally, in this embodiment of this application, after the method shown in FIG. 2, FIG. 3, or FIG. 4 is used to determine that the terminal device uses the first transmission mode, the method may further include the following process.

The second cell group determines whether the second uplink signal can be correctly received within a preset time period. If the second uplink signal can be correctly received, the second cell group continues to maintain the first transmission mode for the terminal device. If the second uplink signal cannot be correctly received, the second cell group switches the transmission mode used by the terminal device from the first transmission mode to the second transmission mode.

Specifically, that the second cell group determines whether the second uplink signal can be correctly received within a preset time period is specifically: The second cell group determines, within the preset time period, whether the received second uplink signal meets a predetermined condition, where for example, the predetermined condition may be that a power for receiving the second uplink signal needs to be greater than a specific threshold, or a value of quality of the received second uplink signal is greater than a specific threshold. If the second uplink signal meets the predetermined condition, the second cell group maintains the first transmission mode of the terminal device. If the second uplink signal does not meet the predetermined condition, the second cell group switches the transmission mode used by the terminal device from the first transmission mode to the second transmission mode.

Figure 6:
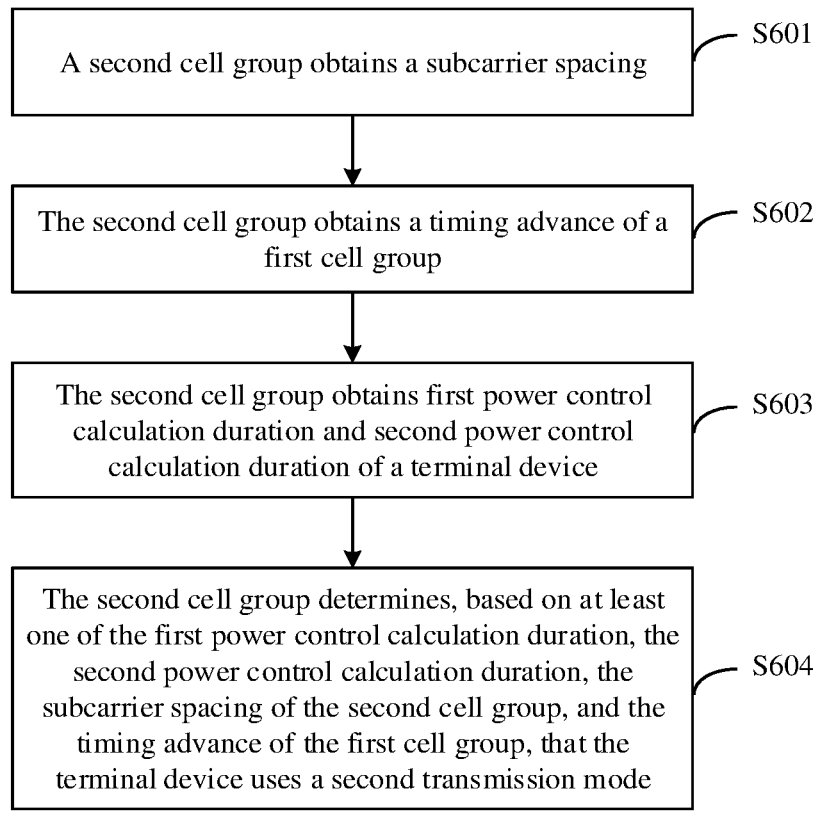
FIG. 6 is a method flowchart of a method for determining a transmission mode of a terminal device according to an embodiment of this application.

Optionally, in this embodiment of this application, after the method shown in FIG. 2, FIG. 3, or FIG. 4 is used to determine that the terminal device uses the first transmission mode, as shown in FIG. 6, the method may further include the following process.

Step S601: The second cell group obtains a subcarrier spacing.

Specifically, the second cell group may obtain the subcarrier spacing of the second cell group, or the second cell group obtains the subcarrier spacing of the first cell group.

Step S602: The second cell group obtains a timing advance.

Specifically, the second cell group may obtain a timing advance of the first cell group, where the timing advance of the first cell group indicates a time difference between an uplink subframe and a downlink subframe in the first cell group. Alternatively, the second cell group may obtain a timing advance of the second cell group, where the timing advance of the second cell group indicates a time difference between an uplink subframe and a downlink subframe in the second cell group.

Step S603: The second cell group obtains first power control calculation duration and second power control calculation duration of the terminal device.

The first power control calculation duration is duration from a time point at which the terminal device receives scheduling information of the first cell group to a time point at which a transmit power of the first cell group has been calculated; and the second power control calculation duration is duration from a time point at which the terminal device starts to calculate a transmit power of the second cell group to a time point at which the terminal device starts to send the second uplink signal. For example, in this embodiment of this application, the terminal device receives, in a downlink subframe n, an uplink signal that is scheduled in an uplink subframe (n+5) and that is sent to the first cell group. However, the terminal device has calculated, in an uplink subframe (n+3), a power for sending an uplink signal in the uplink subframe (n+5). The first power control calculation duration is duration from the downlink subframe n to the uplink subframe (n+3). For example, if the terminal device needs to send an uplink signal to the second cell group in a subframe m, the terminal device may calculate, starting from a subframe (m−6), a power for sending the uplink signal in the second cell group. Duration from the subframe (m−6) to the subframe m may be referred to as the second power control calculation duration.

Step S604: The second cell group determines, based on at least one of the first power control calculation duration, the second power control calculation duration, the subcarrier spacing of the second cell group, and the timing advance of the first cell group, that the terminal device uses the second transmission mode. In an example, when the first power control calculation duration is greater than a first preset threshold, the second cell group may determine that the terminal device uses the second transmission mode; when the second power control calculation duration is greater than a second preset threshold, the second cell group may determine that the terminal device uses the second transmission mode; when the subcarrier spacing of the second cell group is greater than a third preset threshold, the second cell group determines that the terminal device uses the second transmission mode; or when the timing advance of the first cell group is greater than a fourth preset threshold, the second cell group determines that the terminal device uses the second transmission mode. Values of the first preset threshold, the second preset threshold, the third preset threshold, and the fourth preset threshold may be the same or may be different.

In another example, when the following four conditions are met: the first power control calculation duration is greater than the first preset threshold, the second power control calculation duration is greater than the second preset threshold, the subcarrier spacing of the second cell group is greater than the third preset threshold, and the timing advance of the first cell group is greater than the fourth preset threshold, the second cell group may determine that the terminal device uses the second transmission mode. In another example, when two or three of the following conditions are met: the first power control calculation duration is greater than the first preset threshold, the second power control calculation duration is greater than the second preset threshold, the subcarrier spacing of the second cell group is greater than the third preset threshold, and the timing advance of the first cell group is greater than the fourth preset threshold, the second cell group may determine that the terminal device uses the second transmission mode. For example, when the conditions that the first power control calculation duration is greater than the first preset threshold and the second power control calculation duration is greater than the second preset threshold are met, the second cell group may determine that the terminal device uses the second transmission mode.

It should be noted that, in this embodiment of this application, the method for switching the transmission mode of the terminal device by the second cell group shown in FIG. 5 or FIG. 6 may be applied after the second cell group determines that the terminal device uses the first transmission mode shown in FIG. 2, FIG. 3, or FIG. 4 or may be independently applied. For example, the second cell group may directly obtain the second information, and then determine the transmission mode of the terminal device based on the second information. For example, the second cell group switches the transmission mode of the terminal device from the first transmission mode to the second transmission mode based on the second information, or switches the transmission mode of the terminal device from the second transmission mode to the first transmission mode.

This application further provides a communication method, including: determining, by a terminal device, second information, where the second information is used to indicate whether the terminal device supports the first transmission mode in a current scheduling condition, and sending, by the terminal device, the second information to a second cell group.

The second information is capability reporting information of the terminal device; or the second information is information that is carried in power headroom reporting information of the terminal device; or the second information is information that is carried in other information reported by the terminal device.

This application further provides a communication method, including: determining, by a terminal device, first power control calculation duration and second power control calculation duration; and sending, by the terminal device, the first power control calculation duration and the second power control calculation duration to a second cell group.

The first power control calculation duration is duration from a time point at which the terminal device receives scheduling information of the first cell group to a time point at which a transmit power of the first cell group has been calculated; and the second power control calculation duration is duration from a time point at which the terminal device starts to calculate a transmit power of the second cell group to a time point at which the terminal device starts to send the second uplink signal.

In the foregoing embodiments provided in this application, the data sending method provided in the embodiments of this application is described separately from a perspective of network elements and from a perspective of interaction between the network elements. It can be understood that to implement the foregoing functions, network elements, for example, UE, a base station, and a control node include a corresponding hardware structure and/or a corresponding software module that perform/performs the functions. A person skilled in the art should be easily aware that, in combination with the examples described in the embodiments disclosed in this specification, units and algorithms steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 7:
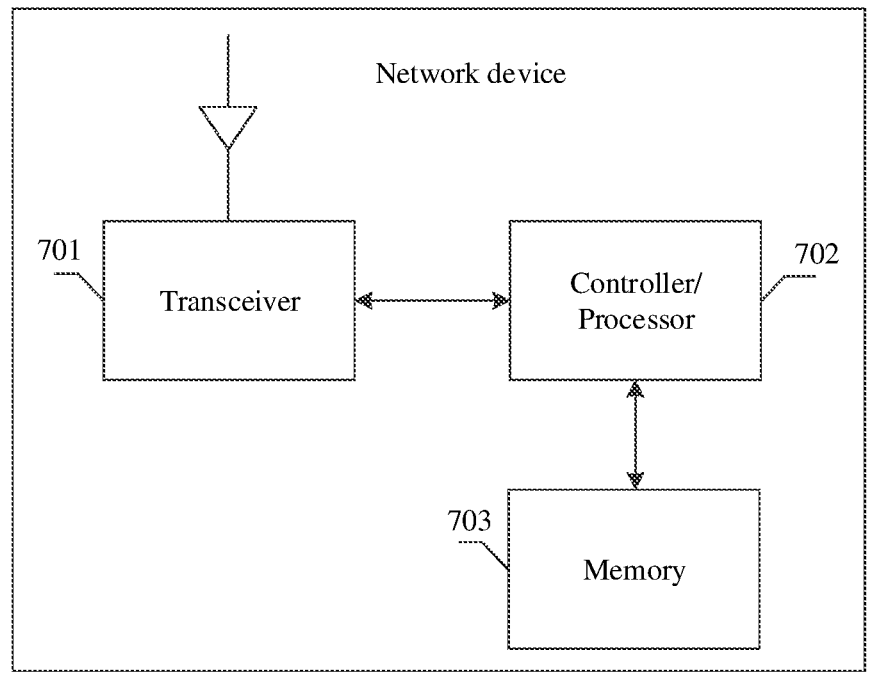
FIG. 7 is a schematic diagram of a network device according to an embodiment of this application.

FIG. 7 is a possible schematic structural diagram of the network device related to the foregoing embodiments. The network device may be the network device 101 or the network device 102 in the communications system 100. As shown in FIG. 7, the network device may include a transceiver 701 and a controller/processor 702. The transceiver 01 may be configured to support information receiving and sending between the network device and the terminal device in the foregoing embodiments, and support radio communication between the terminal device and another terminal device. The controller/processor 702 may be configured to perform various functions for communicating with the terminal device or another network device. On an uplink, an uplink signal from the terminal device is received by an antenna, modulated and demodulated by the transceiver 704 and further processed by the controller/processor 702, to restore service data and signaling information that are sent by the terminal device. On a downlink, service data and a signaling message are processed by the controller/processor 702 and are modulated and demodulated by the transceiver 701 to generate a downlink signal, and the downlink signal is transmitted to the terminal device by using an antenna. A second cell group may be served by the network device, and the second cell group may execute a processing process of the second cell group in FIG. 2 and/or another process used for a technology described in this application, for example, determining a first power configuration value and a second power configuration value, determining that a sum of the first power configuration value and the second power configuration value is greater than a first threshold, and determining whether the terminal device uses a first transmission mode or a second transmission mode, or the like. The network device may further include a memory 703, and the memory 703 may be configured to store program code and data of the base station.

It may be understood that FIG. 7 shows only a simplified design of the base station. In actual application, the base station may include any quantity of transmitters, receivers, processors, controllers, memories, communications units, and the like, and all base stations that can implement the present invention shall fall within the protection scope of the present invention.

Figure 8:
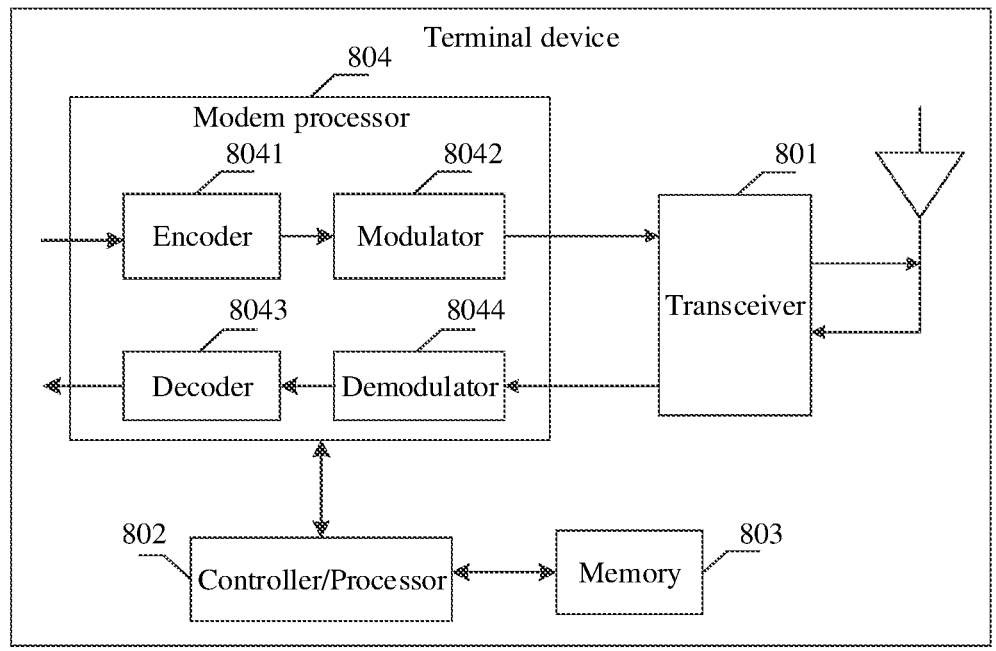
FIG. 8 is a schematic diagram of a terminal device according to an embodiment of this application.

FIG. 8 is a simplified schematic diagram of a possible design structure of the terminal device related to the foregoing embodiments. The terminal device may be the terminal device shown in the procedures in FIG. 1 to FIG. 6. The terminal device may include a transceiver 801 and a controller/processor 802, and may further include a memory 803 and a modem processor 804.

The transceiver 801 adjusts (for example, performs analog conversion, filtering, amplification, and up-conversion on) an output sample and generates an uplink signal. The uplink signal is transmitted to the network device in the foregoing embodiments by using an antenna. On a downlink, an antenna receives a downlink signal transmitted by the network device in the foregoing embodiments. The transceiver 801 adjusts (for example, performs filtering, amplification, down-conversion, and digitization on) the signal received from the antenna and provides an input sample. In the modem processor 804, an encoder 8041 receives service data and a signaling message that are to be sent on an uplink, and processes (for example, formats, encodes, and interleaves) the service data and the signaling message. A modulator 8042 further processes (for example, performs symbol mapping and modulation on) the encoded service data and the encoded signaling message, and provides an output sample. A demodulator 8044 processes (for example, demodulates) the input sample and provides symbol estimation. A decoder 8043 processes (for example, performs de-interleaving and decoding) the symbol estimation and provides decoded data and a decoded signaling message that are to be sent to the UE. The encoder 8041, the modulator 8042, the demodulator 8044, and the decoder 8043 may be implemented by the composite modem processor 804. These units perform processing based on a radio access technology (for example, an access technology in LTE and another evolved system) used in a radio access network.

The transceiver 801 is configured to communicate with a network device, for example, send second information to the network device, or send first power control calculation duration and second power control calculation duration to the network device. The memory 803 is configured to store program code and data of the terminal device.

Figure 9:
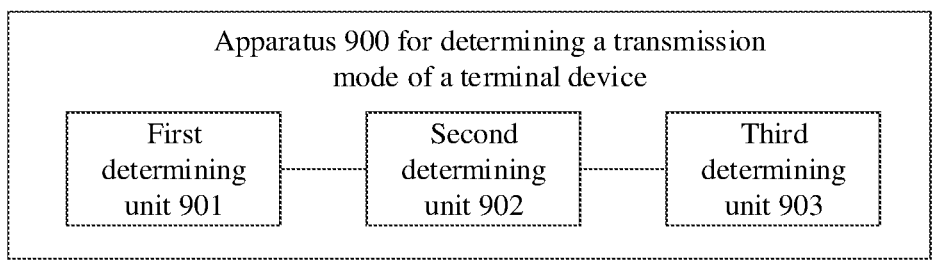
FIG. 9 is a schematic diagram of determining a transmission mode of a terminal device according to an embodiment of this application.

Based on a same concept, as shown in FIG. 9, this application further provides an apparatus 900 for determining a transmission mode of a terminal device. The apparatus 900 includes: a first determining unit 901, configured to determine a first power configuration value and a second power configuration value of the terminal device, where the first power configuration value is a configured transmit power at which the terminal device uses a first radio access technology, and the second power configuration value is a configured transmit power at which the terminal device uses a second radio access technology; a second determining unit 902, configured to determine that a sum of the first power configuration value and the second power configuration value is greater than a first threshold; and a third determining unit 903, configured to determine whether the terminal device uses a first transmission mode or a second transmission mode, where the first transmission mode means that a second power is reduced when a sum of a first power and the second power is greater than a second threshold, and the second transmission mode means that a time division multiplexing mode is used to send a first uplink signal and a second uplink signal; and the first power is a power for sending the first uplink signal, the second power is a power for sending the second uplink signal, the first power is less than or equal to the first power configuration value, the second power is less than or equal to the second power configuration value, the first radio access technology is used to send the first uplink signal, and the second radio access technology is used to send the second uplink signal.

For a specific description of the communications apparatus 900, refer to the foregoing method embodiments. Details are not described herein again.

Figure 10:
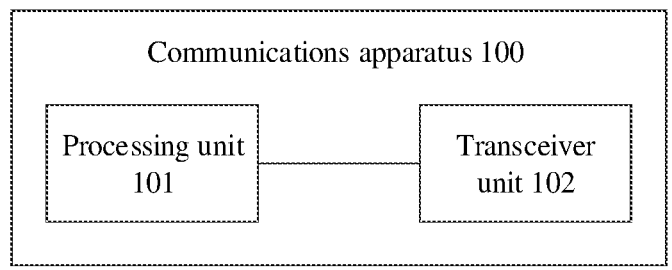
FIG. 10 is a schematic diagram of a communications apparatus according to an embodiment of this application.

Based on a same concept, as shown in FIG. 10, this application further provides a communications apparatus 100, including: a processing unit 101, configured to determine first power control calculation duration and second power control calculation duration, where the first power control calculation duration is duration from a time point at which the terminal device receives scheduling information of the first cell group to a time point at which a transmit power of the first cell group has been calculated; and the second power control calculation duration is duration from a time point at which the terminal device starts to calculate a transmit power of the second cell group to a time point at which the terminal device starts to send the second uplink signal; and a transceiver unit 102, configured to send the first power control calculation duration and the second power control calculation duration; or a processing unit 101, configured to determine second information, where the second information is used to indicate whether the terminal device supports a first transmission mode in a current scheduling condition; and a transceiver unit 102, configured to send the second information.

For a description of the communications apparatus 100, refer to the foregoing method embodiments. Details are not described herein again.

This application further provides a computer-readable storage medium, including an instruction. When the instruction is run on a communications device, the communications device is enabled to perform the foregoing method for determining a transmission mode of a terminal device.

This application further provides a chip. The chip is connected to a memory, and is configured to read and execute a software program stored in the memory, to implement the foregoing method for determining a transmission mode of a terminal device.

A person skilled in the art should understand that the embodiments of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by the computer or the processor of the any other programmable data processing device generate an apparatus for implementing a specific function in one or more processes in the flowcharts and/or in one or more blocks in the block diagrams.

These computer program instructions may alternatively be stored in a computer readable memory that can instruct a computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto the computer or the any other programmable data processing device, so that a series of operations and steps are performed on the computer or the any other programmable device, thereby generating computer-implemented processing. Therefore, the instructions executed on the computer or the any other programmable device provide steps for implementing a specific function in one or more processes in the flowcharts and/or in one or more blocks in the block diagrams.

It is clearly that a person skilled in the art can make various modifications and variations to the embodiments of this application without departing from the spirit and scope of the embodiments of this application. This application is intended to cover these modifications and variations provided that they fall within the scope of protection defined by the following claims and their equivalent technologies of this application.

What is claimed is:

1. A method, comprising:
   determining a first power configuration value and a second power configuration value of a terminal device, wherein the first power configuration value is a configured transmit power corresponding to a first radio access technology usable by the terminal device, and the second power configuration value is a configured transmit power corresponding to a second radio access technology usable by the terminal device;
   determining that a sum of the first power configuration value and the second power configuration value is greater than a first threshold; and
   determining whether the terminal device uses a first transmission mode or a second transmission mode, wherein:
   in the first transmission mode a second power is reduced when a sum of a first power and a second power is greater than a second threshold, and in the second transmission mode a time division multiplexing mode is used to send a first uplink signal and a second uplink signal; and
   the first power is a power for sending the first uplink signal, the second power is a power for sending the second uplink signal, the first power is less than or equal to the first power configuration value, the second power is less than or equal to the second power configuration value, the first radio access technology is used to send the first uplink signal, and the second radio access technology is used to send the second uplink signal.

2. The method according to claim 1, wherein determining whether the terminal device uses the first transmission mode or the second transmission mode comprises:
   determining first information, wherein the first information indicates that the terminal device supports the first transmission mode, or the first information indicates that the terminal device does not support the first transmission mode; and
   determining, based on the first information, whether the terminal device uses the first transmission mode or the second transmission mode.

3. The method according to claim 2, wherein:
   the first uplink signal is to be sent by the terminal device to at least one cell in a first cell group, and the second uplink signal is to be sent by the terminal device to at least one cell in a second cell group; and
   determining, based on the first information, whether the terminal device uses the first transmission mode or the second transmission mode comprises:
   determining, based on the first information and a first condition, whether the terminal device uses the first transmission mode or the second transmission mode, wherein the first condition indicates that a subcarrier spacing of the second cell group is greater than or is greater than or equal to a first value; or determining, based on the first information and a second condition, whether the terminal device uses the first transmission mode or the second transmission mode, wherein the second condition indicates that a timing advance is less than or is less than or equal to a second value, and the timing advance indicates a time difference between an uplink subframe and a downlink subframe in the first cell group.

4. The method according to claim 3, wherein determining, based on the first information and the first condition, whether the terminal device uses the first transmission mode or the second transmission mode comprises:
  when the first information indicates that the terminal device supports the first transmission mode and the first condition is met, determining that the terminal device uses the first transmission mode; or
  when the first information indicates that the terminal device supports the first transmission mode but the first condition is not met, determining that the terminal device uses the second transmission mode.

5. The method according to claim 3, wherein determining, based on the first information and the second condition, whether the terminal device uses the first transmission mode or the second transmission mode comprises:
  when the first information indicates that the terminal device supports the first transmission mode and the second condition is met, determining that the terminal device uses the first transmission mode; or
  when the first information indicates that the terminal device supports the first transmission mode but the second condition is not met, determining that the terminal device uses the second transmission mode.

6. The method according to claim 3, wherein the first value is 30 kilohertz, and the second value is 0.1 millisecond.

7. The method according to claim 3, wherein the first uplink signal is to be sent by the terminal device to the at least one cell in the first cell group, and the second uplink signal is to be sent by the terminal device to the at least one cell in the second cell group; and
  wherein after determining that the terminal device uses the first transmission mode, the method further comprises:
    obtaining a subcarrier spacing of the second cell group;
    obtaining a timing advance of the first cell group, wherein the timing advance indicates a time difference between an uplink subframe and a downlink subframe in the first cell group;
  obtaining a first power control calculation duration and a second power control calculation duration of the terminal device, wherein the first power control calculation duration is a duration from a time point at which the terminal device receives scheduling information of the first cell group to a time point at which a transmit power of the first cell group has been calculated, and the second power control calculation duration is a duration from a time point at which the terminal device starts to calculate a transmit power of the second cell group to a time point at which the terminal device starts to send the second uplink signal; and
  determining, based on the first power control calculation duration, the second power control calculation duration, the subcarrier spacing of the second cell group, or the timing advance of the first cell group, that the terminal device uses the second transmission mode.

8. The method according to claim 2, wherein after determining that the terminal device uses the first transmission mode, the method further comprises:
  receiving second information, wherein the second information is reported by the terminal device, and the second information indicates whether the terminal device supports the first transmission mode in a current scheduling condition; and
  determining, based on the second information, that the terminal device uses the second transmission mode.

9. The method according to claim 8, wherein the second information is:
  capability reporting information of the terminal device; or
  information that is obtained from power headroom reporting information of the terminal device about whether the terminal device supports the first transmission mode; or
  information that is obtained from other information reported by the terminal device about whether the terminal device supports the first transmission mode.

10. The method according to claim 2, wherein after determining that the terminal device uses the first transmission mode, the method further comprises:
  determining that the second uplink signal cannot be correctly received within a preset time period; and
  determining that the terminal device uses the second transmission mode.

11. An apparatus, comprising:
  a processor; and
  a non-transitory computer-readable storage medium storing a program to be executed by the processor, the program including instructions for:
    determining a first power configuration value and a second power configuration value of a terminal device, wherein the first power configuration value is a configured transmit power corresponding to a first radio access technology usable by the terminal device, and the second power configuration value is a configured transmit power corresponding to a second radio access technology usable by the terminal device;
    determining that a sum of the first power configuration value and the second power configuration value is greater than a first threshold; and
    determining whether the terminal device uses a first transmission mode or a second transmission mode, wherein in the first transmission mode a second power is reduced when a sum of a first power and the second power is greater than a second threshold, and in the second transmission mode a time division multiplexing mode is used to send a first uplink signal and a second uplink signal, and wherein:
    the first power is a power for sending the first uplink signal, the second power is a power for sending the second uplink signal, the first power is less than or equal to the first power configuration value, the second power is less than or equal to the second power configuration value, the first radio access technology is used to send the first uplink signal, and the second radio access technology is used to send the second uplink signal.

12. The apparatus according to claim 11, wherein the program includes instructions for:
  determine first information, wherein the first information indicates that the terminal device supports the first transmission mode, or the first information indicates that the terminal device does not support the first transmission mode; and determine, based on the first information, whether the terminal device uses the first transmission mode or the second transmission mode.

13. The apparatus according to claim 12, wherein the first uplink signal is to be sent by the terminal device to at least one cell in a first cell group, and the second uplink signal is to be sent by the terminal device to at least one cell in a second cell group; and wherein the instructions for determining, based on the first information, whether the terminal device uses the first transmission mode or the second transmission mode, include instructions for:

determining, based on the first information and a first condition, whether the terminal device uses the first transmission mode or the second transmission mode, wherein the first condition indicates that a subcarrier spacing of the second cell group is greater than or is greater than or equal to a first value; or determining, based on the first information and a second condition, whether the terminal device uses the first transmission mode or the second transmission mode, wherein the second condition indicates that a timing advance is less than or is less than or equal to a second value, and the timing advance indicates a time difference between an uplink subframe and a downlink subframe in the first cell group.

14. The apparatus according to claim 13, wherein the instructions for determining, based on the first information and the first condition, whether the terminal device uses the first transmission mode or the second transmission mode, include instructions for:

when the first information indicates that the terminal device supports the first transmission mode and the first condition is met, determine that the terminal device uses the first transmission mode; or when the first information indicates that the terminal device supports the first transmission mode but the first condition is not met, determine that the terminal device uses the second transmission mode.

15. The apparatus according to claim 13, wherein the instructions for determining, based on the first information and the second condition, whether the terminal device uses the first transmission mode or the second transmission mode, comprise instructions for:

when the first information indicates that the terminal device supports the first transmission mode and the second condition is met, determine that the terminal device uses the first transmission mode; or when the first information indicates that the terminal device supports the first transmission mode but the second condition is not met, determine that the terminal device uses the second transmission mode.

16. The apparatus according to claim 13, wherein the first uplink signal is to be sent by the terminal device to the at least one cell in the first cell group, and the second uplink signal is to be sent by the terminal device to the at least one cell in the second cell group; and wherein the program includes instructions for:

obtaining a subcarrier spacing of the second cell group;

obtaining a timing advance of the first cell group, wherein the timing advance indicates the time difference between an uplink subframe and a downlink subframe in the first cell group;

obtaining a first power control calculation duration and a second power control calculation duration of the terminal device, wherein the first power control calculation duration is a duration from a time point at which the terminal device receives scheduling information of the first cell group to a time point at which a transmit power of the first cell group has been calculated, and the second power control calculation duration is a duration from a time point at which the terminal device starts to calculate a transmit power of the second cell group to a time point at which the terminal device starts to send the second uplink signal; and determining, based on the first power control calculation duration, the second power control calculation duration, the subcarrier spacing of the second cell group, or the timing advance of the first cell group, that the terminal device uses the second transmission mode.

17. The apparatus according to claim 12, further comprising:

a receiver, configured to:

after it is determined that the terminal device uses the first transmission mode, receive second information, wherein the second information is reported by the terminal device, and the second information indicates whether the terminal device supports the first transmission mode in a current scheduling condition; and wherein the program includes instructions for determining, based on the second information, that the terminal device uses the second transmission mode.

18. The apparatus according to claim 12, wherein the program includes instructions for:

determining that the second uplink signal cannot be correctly received within a preset time period; and determining that the terminal device uses the second transmission mode.

19. An apparatus, comprising:

a processor; and a non-transitory computer-readable storage medium storing a program to be executed by the processor, the program including instructions for:

determining a first power control calculation duration and a second power control calculation duration, wherein the first power control calculation duration is a duration from a time point at which a terminal device receives scheduling information of a first cell group to a time point at which a transmit power of the first cell group has been calculated, and the second power control calculation duration is a duration from a time point at which the terminal device starts to calculate a transmit power of a second cell group to a time point at which the terminal device starts to send a second uplink signal; and a transceiver, configured to send the first power control calculation duration and the second power control calculation duration.

* * * * *